US008290251B2

(12) United States Patent
Mahajan et al.

(10) Patent No.: US 8,290,251 B2
(45) Date of Patent: Oct. 16, 2012

(54) IMAGE STYLIZATION USING SPARSE REPRESENTATION

(75) Inventors: Dhruv Mahajan, New York, NY (US); Sylvain Paris, Boston, MA (US); Wojciech Matusik, Lexington, MA (US)

(73) Assignee: Adobe Systems Incorporated, San Jose, CA (US)

(*) Notice: Subject to any disclaimer, the term of this patent is extended or adjusted under 35 U.S.C. 154(b) by 994 days.

(21) Appl. No.: 12/323,677

(22) Filed: Nov. 26, 2008

(65) Prior Publication Data

US 2010/0046829 A1 Feb. 25, 2010

Related U.S. Application Data

(60) Provisional application No. 61/090,805, filed on Aug. 21, 2008.

(51) Int. Cl.
*G06K 9/62* (2006.01)
*G06K 9/40* (2006.01)

(52) U.S. Cl. .......... 382/159; 382/260; 382/276
(58) Field of Classification Search .......... 382/254, 382/260, 276, 100, 159, 173, 253; 375/240.22
See application file for complete search history.

(56) References Cited

U.S. PATENT DOCUMENTS

| 2008/0170623 | A1* | 7/2008 | Aharon et al. | 375/240.22 |
|---|---|---|---|---|
| 2010/0020208 | A1* | 1/2010 | Barbu | 348/250 |
| 2011/0064302 | A1* | 3/2011 | Ma et al. | 382/159 |

OTHER PUBLICATIONS

Foucher. "SAR Image Filtering via Learned Dictionaries and Sparse Representations." IEEE International Geoscience and Remote Sensing Symposium, vol. 1, Jul. 7, 2008, p. I-229-I-232.*
Mairal et al. "Sparse Representation for Color Image Restoration." IEEE Transactions on Image Processing, vol. 17, No. 1, Jan. 2008, pp. 53-69.*
Elad, Michael and Aharon, Michal, "Image Denoising Via Learned Dictionaries and Sparse representation." Department of Computer Science, The Technion—Israel Institute of Technology, Haifa 32000 Israel, 2006, 6 pages.
Hertzmann et al, "Image Analogies." 2001, 14 pages.
Mairal et al, "Learning Multiscale Sparse Representations for Image and Video Restoration." 2007, 27 pages.
Yang et al, "Image Super-Resolution as Sparse Representation of Raw Image Patches." University of Illinois at Urbana-Champagin, Beckman Institute and Coordinated Science Laboratory, 2008, 8 pages.

* cited by examiner

*Primary Examiner* — Jon Chang
(74) *Attorney, Agent, or Firm* — Fish & Richardson P.C.

(57) ABSTRACT

A computer-implemented method that includes segmenting a training image into training image patches, where each training image patch is represented by a linear combination of dictionary image patches from an image dictionary, and each dictionary image patch has a sparse representation coefficient. The method includes segmenting a stylized training image into stylized training image patches, where each stylized training image patch is represented by a linear combination of stylized dictionary image patches from a stylized image dictionary, and each stylized dictionary image patch has a sparse representation coefficient. The method also includes training the image dictionary with the training image patches and the stylized image dictionary with the stylized training image patches in a substantially simultaneous manner. The sparse representation coefficient for each training image patch is substantially similar to the sparse representation coefficient for the corresponding stylized training image patch.

22 Claims, 10 Drawing Sheets

IMAGE STYLIZATION USING SPARSE REPRESENTATION

CROSS REFERENCE TO RELATED APPLICATIONS

This U.S. patent application claims priority under 35 U.S.C. §119(e) to U.S. Provisional Application 61/090,805, filed on Aug. 21, 2008. The disclosure of this prior application is considered part of the disclosure of this application and is incorporated herein by reference in its entirety.

BACKGROUND

This disclosure relates to image stylization using sparse representation.

Sparse representation of images is used for de-noising and in-painting of images. The use of sparse and redundant representations over trained dictionaries has been found to be highly effective and promising for addressing image de-noising problems.

SUMMARY

An image stylization technique represents a patch in an image as a linear combination of a sparse number of patches chosen from a trained dictionary. Stylization of an input image may include two stages, for example, a dictionary training stage and an image sparse representation stage. In the dictionary training stage, a training image (e.g., original or un-stylized image) and a stylized training image are used simultaneously to train or teach dictionaries for the respective images. In the image sparse representation stage, a stylized output image is produced for the input image using the trained dictionaries, thereby improving the quality of image reconstruction.

In general, one aspect of the subject matter described in this specification can be embodied in a method including executing instructions on a specific apparatus so that binary digital electronic signals representing a training image are segmented into binary digital electronic signals representing a plurality of training image patches. Each training image patch is represented by a linear combination of dictionary image patches from an image dictionary, and each dictionary image patch has a sparse representation coefficient. The method includes executing instructions on the specific apparatus so that binary digital electronic signals representing a stylized training image are segmented into binary digital electronic signals representing a plurality of training image patches. Each stylized training image patch being represented by a linear combination of stylized dictionary image patches from a stylized image dictionary, and each stylized dictionary image patch has a sparse representation coefficient. The method further includes executing instructions on the specific apparatus so that the image dictionary is trained substantially simultaneously with the training image patches and the stylized image dictionary with the stylized training image patches. The sparse representation coefficient for each training image patch is substantially similar to the sparse representation coefficient for the corresponding stylized training image patch. The method includes storing the resulting binary digital electronic signals representing the corresponding image dictionary and the stylized image dictionary in a location in memory of the specific apparatus for later use.

In general, one aspect of the subject matter described in this specification can be embodied in a computer-implemented method that includes segmenting a training image into training image patches, where each training image patch is represented by a linear combination of dictionary image patches from an image dictionary, and each dictionary image patch has a sparse representation coefficient. The method includes segmenting a stylized training image into stylized training image patches, where each stylized training image patch is represented by a linear combination of stylized dictionary image patches from a stylized image dictionary, and each stylized dictionary image patch has a sparse representation coefficient. The method also includes substantially simultaneously training the image dictionary with the training image patches and the stylized image dictionary with the stylized training image patches. The sparse representation coefficient for each training image patch is substantially similar to the sparse representation coefficient for the corresponding stylized training image patch. Other implementations of this aspect include corresponding systems, apparatus, and computer program products.

These and other implementations can optionally include one or more of the following features. The method may further include initializing the image dictionary and the stylized image dictionary. In some examples, the method includes segmenting an input image into input image patches, and for each input image patch, determining sparse representation coefficients for a linear combination of trained image patches of the trained image dictionary. The method includes, for each input image patch, producing a corresponding output stylized image patch as a linear combination of trained stylized image patches of the trained stylized image dictionary using the input image patch sparse representation coefficients. The method further includes producing an output stylized image using the output stylized image patches. In some implementations, the sparse coefficients for each input image patch approximately represent an output stylized image patch of the output stylized image with the stylized image dictionary. Furthermore, an atom index included in the image dictionary may be substantially equivalent to an atom index included in the stylized image dictionary. Each dictionary may comprise an over-complete basis. In some examples, the image dictionary and the stylized image dictionary are trained iteratively. The image dictionary and the stylized image dictionary may be substantially aligned so that the corresponding image patches use the same dictionary atom indexes from the respective dictionaries with substantially similar sparse representation coefficients.

In general, another aspect of the subject matter described in this specification can be embodied in a system comprising a computing device that includes a dictionary trainer for segmenting a training image into training image patches and segmenting a stylized training image into stylized training image patches. Each training image patch is represented by a linear combination of dictionary image patches from an image dictionary, and each dictionary image patch has a sparse representation coefficient. Also, each stylized training image patch is represented by a linear combination of stylized dictionary image patches from a stylized image dictionary, and each stylized dictionary image patch has a sparse representation coefficient. The dictionary trainer is configured to substantially simultaneously train the image dictionary with the training image patches and the stylized image dictionary with the stylized training image patches, and sparse representation coefficients for each training image patch and corresponding stylized training image patch are substantially similar (e.g., to couple the image dictionary and the stylized image dictionary).

These and other implementations can optionally include one or more of the following features. The computing device may further include an image stylizer for segmenting an input image into input image patches. The image stylizer is configured to determine sparse representation coefficients for a linear combination of trained image patches of the trained image dictionary for each input image patch. The image stylizer is also configured to produce a corresponding output stylized image patch for each input image patch from a linear combination of trained stylized image patches of the trained stylized image dictionary using the input image patch sparse representation coefficients. The image stylizer is configured to produce an output stylized image using the output stylized image patches. In some implementations, the sparse coefficients for each input image patch approximately represent an output stylized image patch of the output stylized image with the stylized image dictionary. Furthermore, an atom index included in the image dictionary may be substantially equivalent to an atom index included in the stylized image dictionary. Each dictionary may comprise an over-complete basis. In some examples, the dictionary trainer iteratively trains the image dictionary and the stylized image dictionary. The dictionary trainer may substantially align the image dictionary and the stylized image dictionary so that the corresponding image patches use the same dictionary atom indexes from the respective dictionaries with substantially similar sparse representation coefficients.

In general, another aspect of the subject matter described in this specification can be embodied in a computer program product, encoded on a computer-readable medium, operable to cause data processing apparatus to perform operations that include segmenting a training image into training image patches, where each training image patch is represented by a linear combination of dictionary image patches from an image dictionary, and each dictionary image patch has a sparse representation coefficient. Operations include segmenting a stylized training image into stylized training image patches, where each stylized training image patch is represented by a linear combination of stylized dictionary image patches from a stylized image dictionary, and each stylized dictionary image patch has a sparse representation coefficient. Operations further include substantially simultaneously training the image dictionary with the training image patches and the stylized image dictionary with the stylized training image patches. The sparse representation coefficient for each training image patch is substantially similar to the sparse representation coefficient for the corresponding stylized training image patch. Other implementations of this aspect include corresponding systems, apparatus, and computer program products.

These and other implementations can optionally include one or more of the following features. Operations may include initializing the image dictionary and the stylized image dictionary. In some examples, operations include segmenting an input image into input image patches, and for each input image patch, determining sparse representation coefficients for a linear combination of trained image patches of the trained image dictionary. Operations include, for each input image patch, producing a corresponding output stylized image patch as a linear combination of trained stylized image patches of the trained stylized image dictionary using the input image patch sparse representation coefficients. Operations further include producing an output stylized image using the output stylized image patches. In some implementations, the sparse coefficients for each input image patch approximately represent an output stylized image patch of the output stylized image with the stylized image dictionary. Furthermore, an atom index included in the image dictionary may be substantially equivalent to an atom index included in the stylized image dictionary. Each dictionary may comprise an over-complete basis. In some examples, operations include iteratively training the image dictionary and the stylized image dictionary. Operations may also include substantially aligning the image dictionary and the stylized image dictionary so that the corresponding image patches use the same dictionary atom indexes from the respective dictionaries with substantially similar sparse representation coefficients.

Particular implementations of the subject matter described in this specification can be implemented to realize one or more of the following advantages. Sparse representation of images may be very efficient and robust for state of the art image de-noising and in-painting results and/or providing stylization of images.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
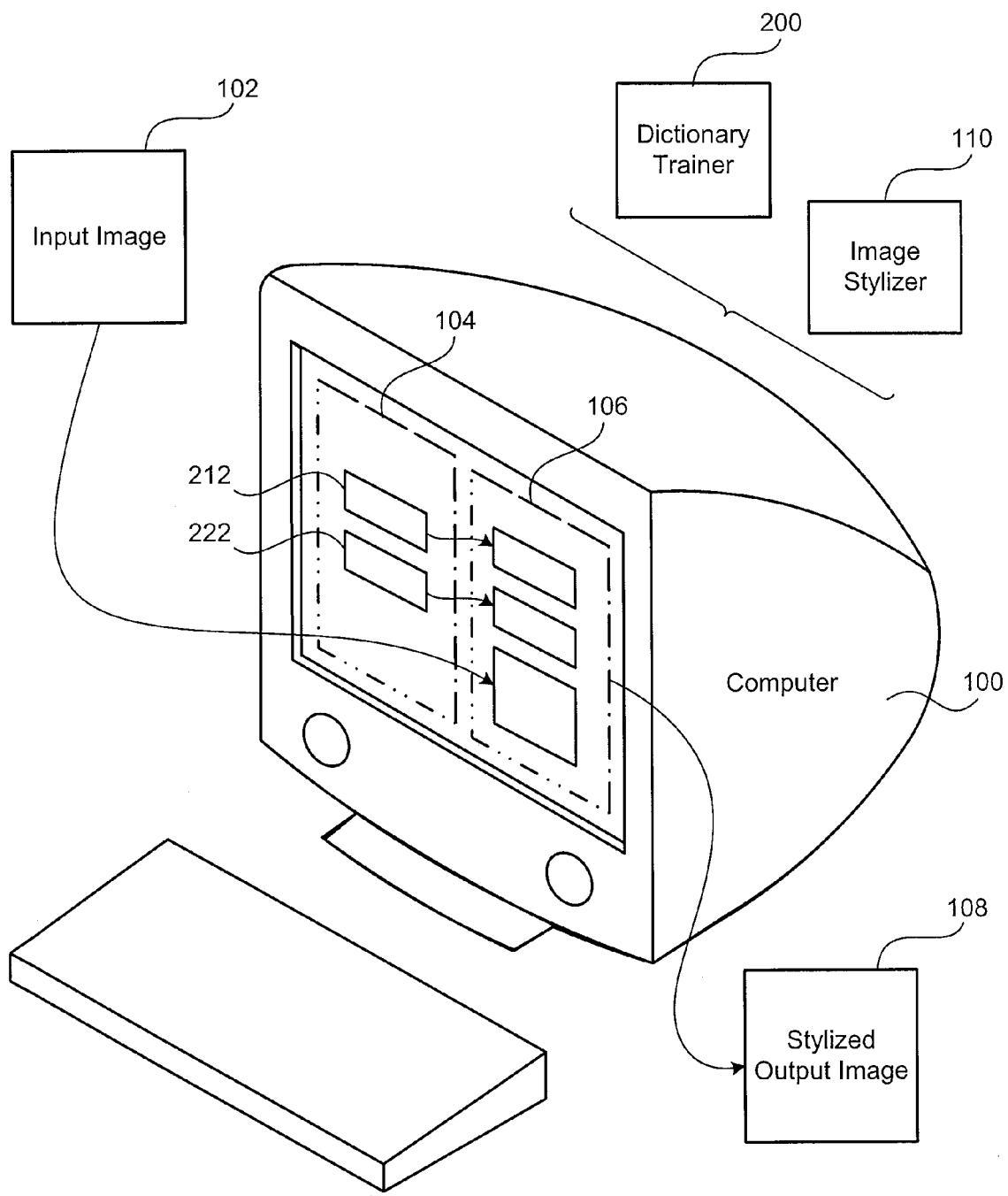
FIG. 1 is a schematic view of a computer for processing images.
Figure 2:
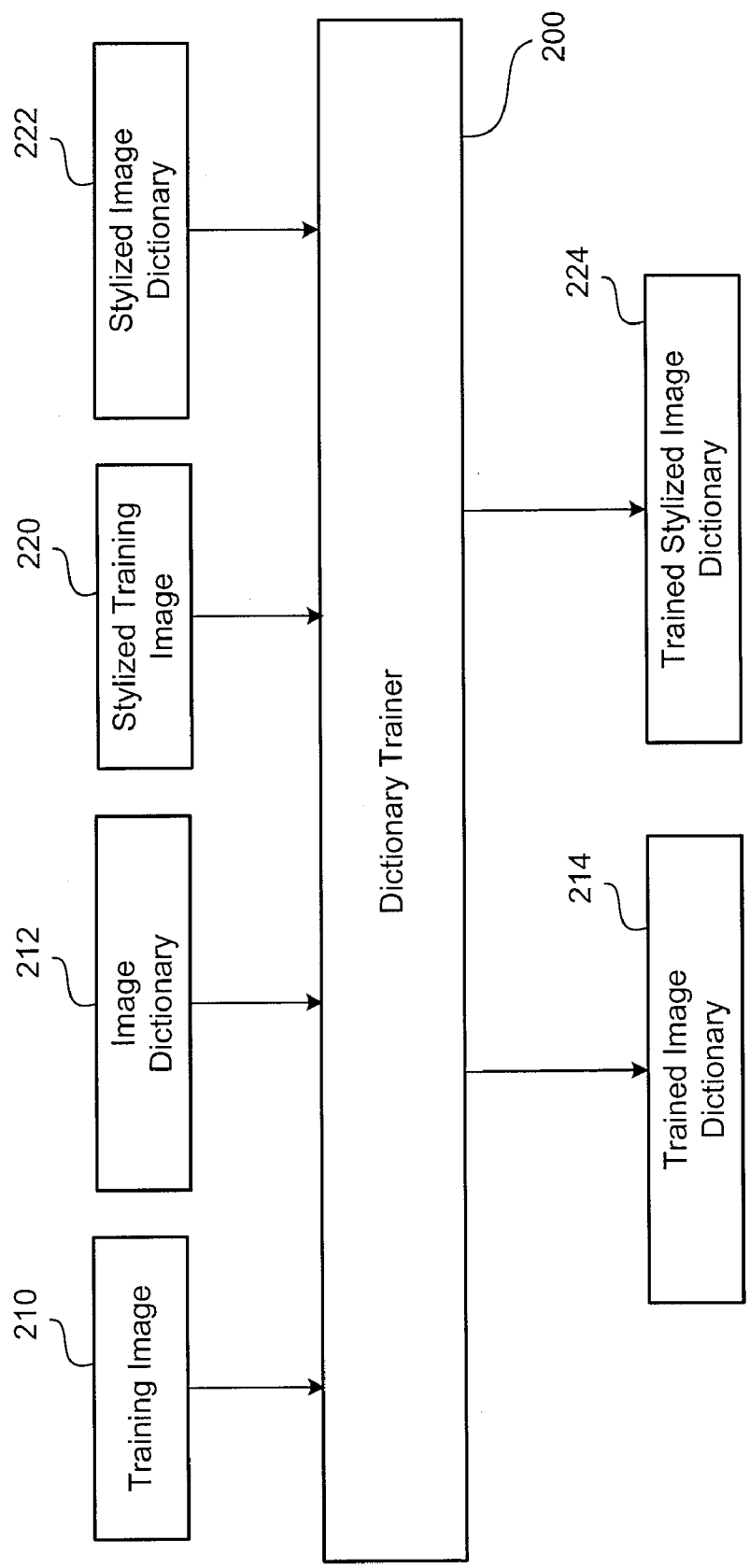
FIG. 2 is a schematic view of a dictionary trainer for training dictionaries.
Figure 3:
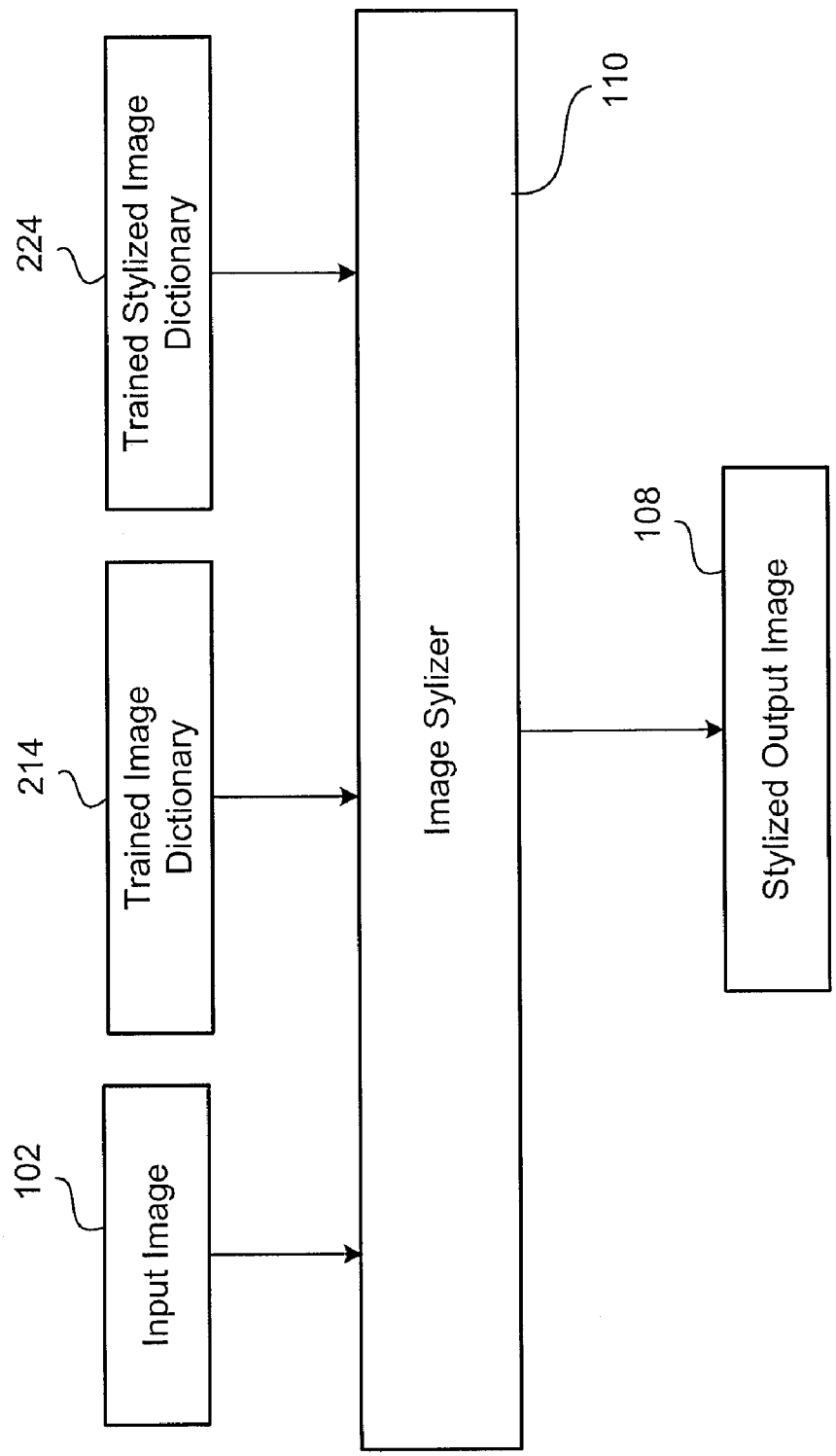
FIG. 3 is a schematic view of an image sytlizer for producing a stylized image of a received image.

FIGS. 1-3 illustrate, in general, an image stylization technique implementable on a computer 100. Stylization of an input image 102 may include two stages, for example, a dictionary training stage 104 and an image sparse representation stage 106. In the dictionary training stage 104, a dictionary trainer 200 uses a training image 210 (e.g., an original or un-stylized image) and a stylized training image 220 to substantially simultaneously train or teach dictionaries 212, 222 for the respective images. In the image sparse representation stage 106, an image stylizer 110 produces a stylized output image 108 of the input image 102 using the trained dictionaries 212, 222.

In some implementations, an image stylizer 110, executable on the computer 100, is configured to receive the input image 102 and produce a stylized output image 108 using one or more sparse image representation techniques. Referring to FIG. 2, a dictionary trainer 200, executable on the computer 100, receives a training image 210 (e.g., original or unstylized image) and corresponding image dictionary 212 as well as a stylized training image 220 (e.g., stylized version of the training image 210) and a corresponding stylized image dictionary 222 for training. Using the training image 210 and the stylized training image 220, the dictionary trainer 200 trains or teaches the image dictionary 212 and the stylized image dictionary 222 such that sparse representation coefficients associated with representing the training image 210 (e.g., via segments or patches of the image) is substantially similar to sparse representation coefficients associated with representing the stylized training image 220 (e.g., via corresponding segments or patches of the stylized image) to couple the image dictionary 212 and the stylized image dictionary 222. Referring to FIG. 3, the image stylizer 110 uses the trained image dictionary 214 and the trained stylized image dictionary 224 along with one or more sparse image representation techniques to produce the stylized output image 130 of the received input image 102.

Figure 4:
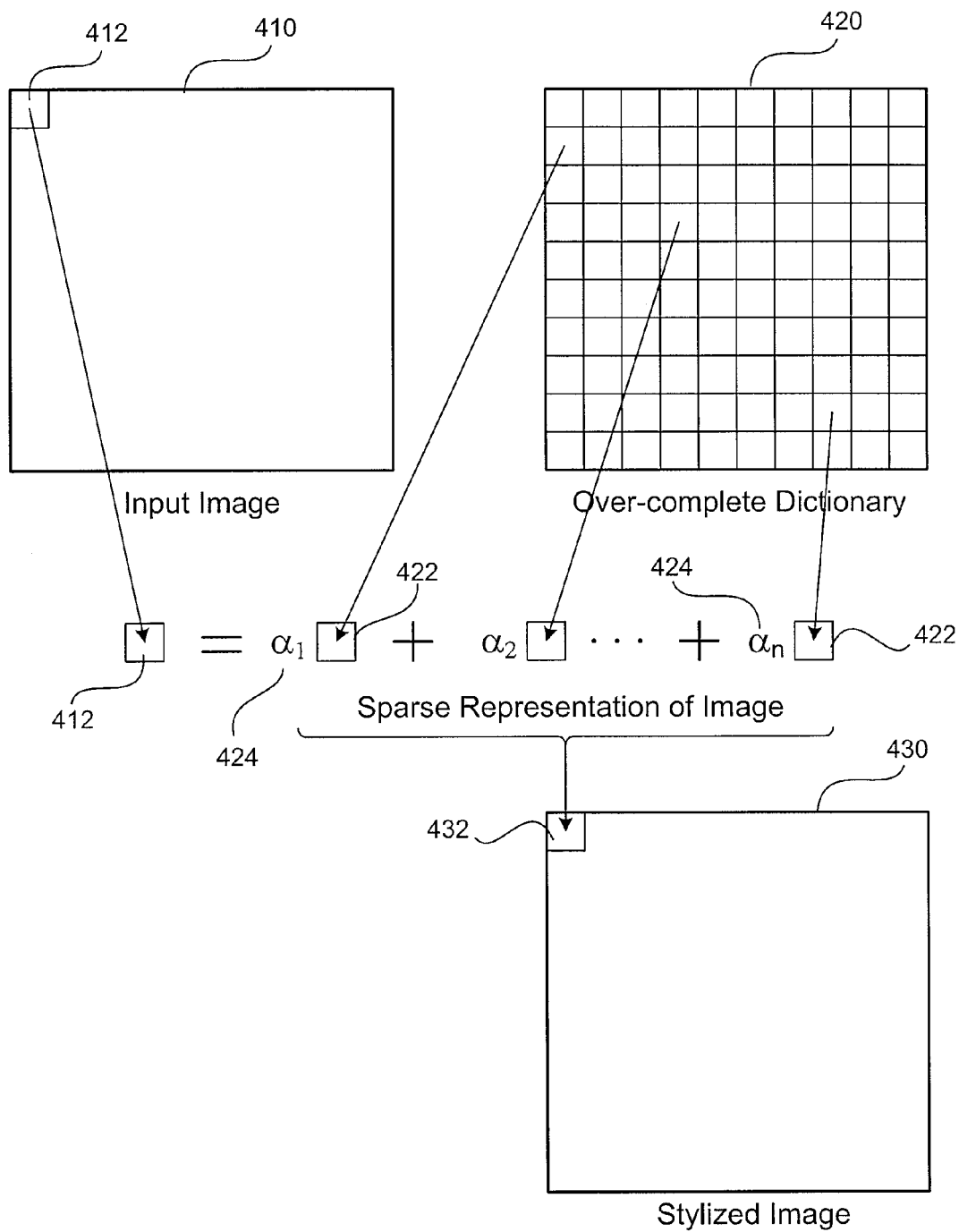
FIG. 4 is a schematic view of a sparse representation of an image.

FIG. 4 illustrates an exemplary sparse image representation technique that includes dividing the input image 410 into image segments (referred to as input image patches 412) and representing each input image patch 412 as a linear combination of a sparse number of dictionary patches 422 from an over-complete dictionary 420. The over-complete dictionary 420 is an over-complete basis where the number of basis vectors is greater than the dimensionality of the input, and the representation of an input is not a unique combination of basis vectors. Over-complete representations provide greater robustness in the presence of noise and can be relatively sparser. An iterative process may be employed to learn patch coefficients 424 (e.g., a representation) and update the over-complete dictionary 420. The over-complete dictionary 420 may be specific to a particular image or to a class of images (e.g., natural images). The linear combination of a sparse number of dictionary patches 422 representing the input image patch 412 are used to form a corresponding sparse representation patch 432 of a sparsely represented stylized output image 430.

Figure 5:
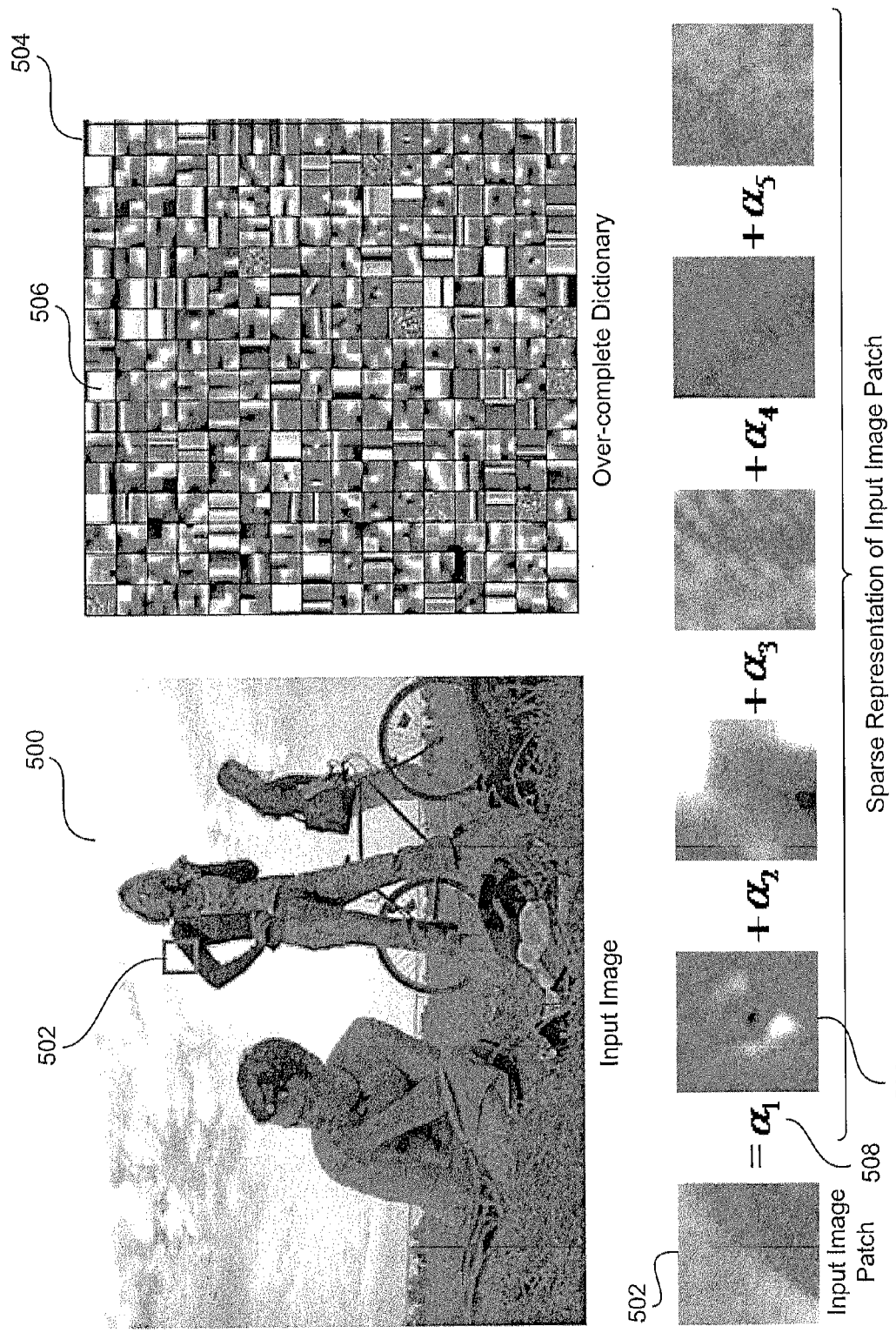
FIG. 5 is a schematic view of a sparse representation of an image patch.

FIG. 5 illustrates an exemplary input image patch 502 of an input image 500 being represented by a linear combination of dictionary patches 506 from an over-complete example dictionary 504. In some implementations, the image stylizer 110 produces the linear combination of dictionary patches 506, which each have a patch coefficient 508 (e.g., a weight) to represent each input image patch 502 of the input image 500. Each patch coefficient 508 may represent real, complex, or a combination of real and complex values. Each patch coefficient 508 may also be defined by one or more functions or mathematical expressions. The linear combination of dictionary patches 506 provides a sparse representation of the input image patch 502, which may be used to construct a stylized output image of the input image 500.

Figure 6:
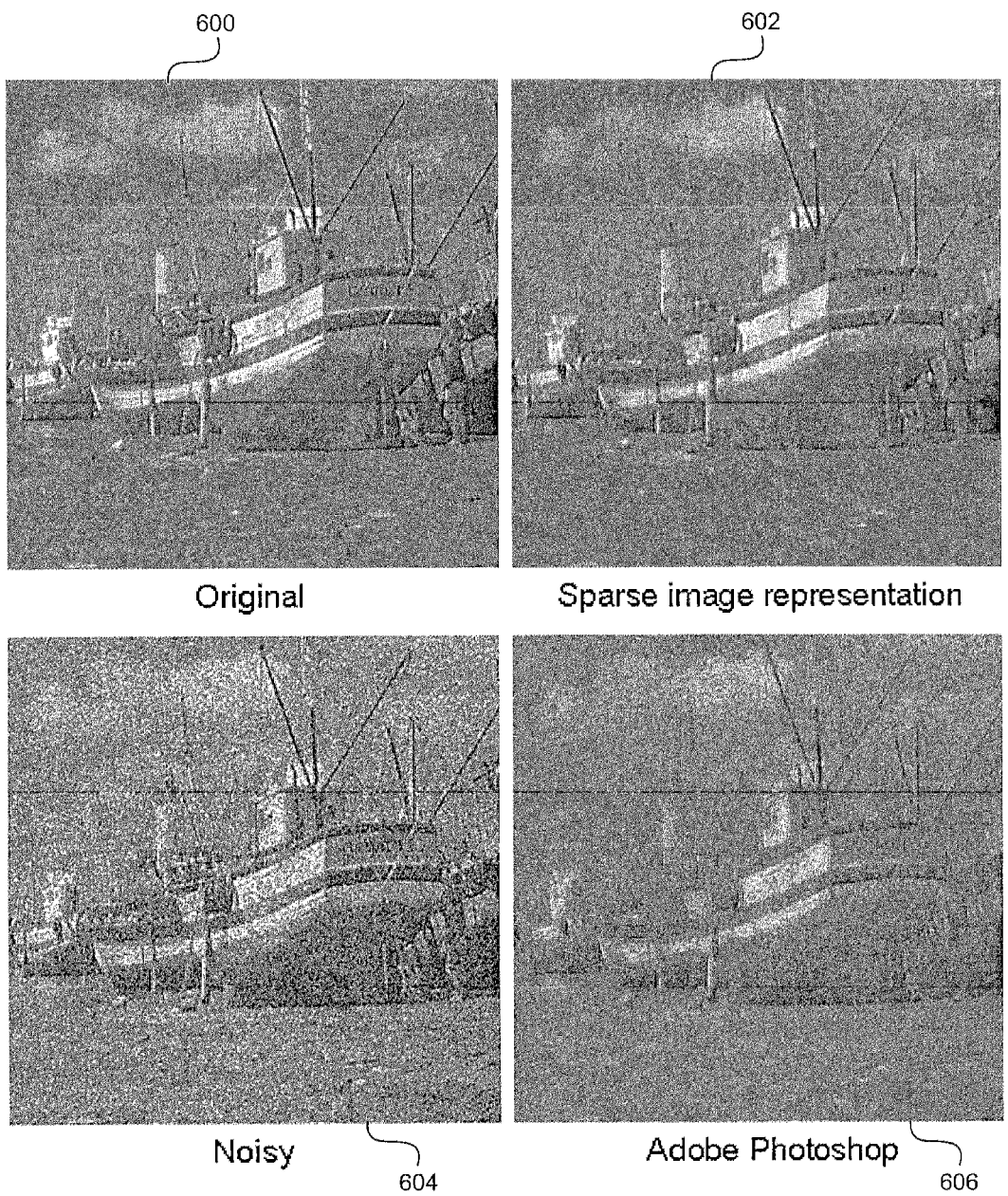
FIG. 6 is a schematic view of de-noised images.

Along with reducing visual noise, sparse representations of images may also be used for other types of image processing (e.g., in-painting). FIG. 6 illustrates an example of a sparse representation image 602 of an original input image 600, along with a noisy version 604 of the input image 600 and a filtered image 606 produced by a de-noising filter such as a de-noising filter provided by the Adobe® Photoshop® image-editing and graphics production software (from Adobe Systems, Inc. of San Jose, Calif.).

Figure 7:
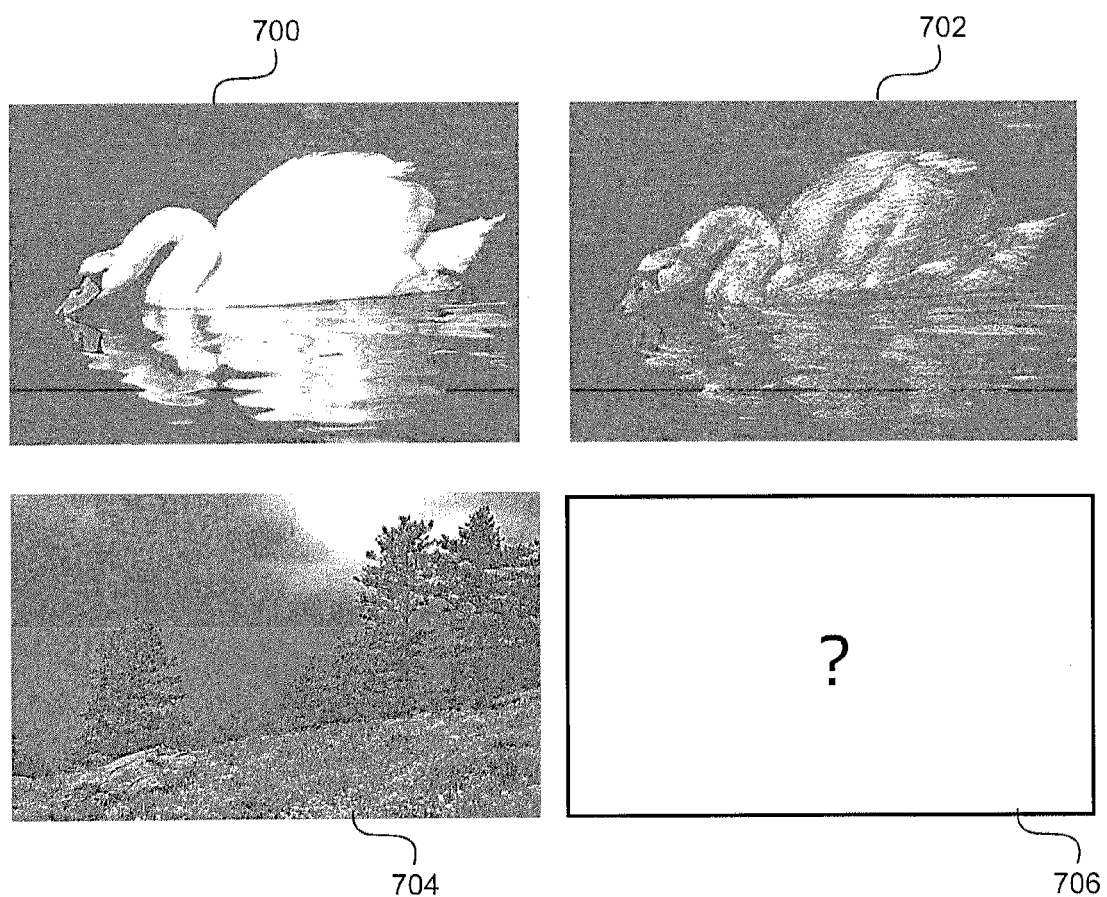
FIG. 7 is a schematic view of exemplary training images for a dictionary trainer, and an exemplary original input image for an image stylizer.

The image stylizer 110 may execute a sparse image representation technique that extends to multi-scale (e.g., LaPlacian pyramids) for improving the quality and speed of a reconstructed image. FIG. 7 illustrates an example of a sparse image representation technique extended for fast application of non-linear filters, such as stylized painting. An input image 700 and a stylized input image 702 (e.g., stylized version of the input image 700) are used in training corresponding input image and stylized input image dictionaries (not shown). The image stylizer 110 may use the trained dictionaries in executing a sparse image representation technique on a target image 704 to produce a stylized target image 706 with better efficiency, accuracy and robustness than the image analogies technique described in HERTZMANN, A., JACOBS, C. E., OLIVER, N., CURLESS, B., AND SALESIN, D. H. 2001, "Image Analogies," In SIGGRAPH 2001, Computer Graphics Proceedings, ACM Press/ACM SIGGRAPH, E. Fiume, Ed., 327-340, the contents of which is hereby incorporated by reference in its entirety. The sparse image representation technique disclosed has a good potential for other fast image editing operations since the size of the dictionary is much smaller than the size of the image from which it is derived. Hence, applying suitable transformations on the dictionary may allow mimicking of certain filters on the image in a fast and very efficient way.

A technique for sparse image representation for de-noising is described in ELAD, M., AND AHARON, M. 2006, "Image Denoising Via Learned Dictionaries and Sparse representation," In CVPR '06: Proceedings of the 2006 IEEE Computer Society Conference on Computer Vision and Pattern Recognition, IEEE Computer Society, Washington, D.C., USA, 895-900, the contents of which is hereby incorporated by reference in its entirety. The sparse image representation technique includes representation of a patch in an image as a linear combination of sparse (typically 6) number of patches derived from a global dictionary of patches (typically 256). The dictionary and patch representation are learned iteratively. The algorithm for such technique includes: 1) Take all the overlapping n×n patches $p_i$ by shifting one pixel at a time; 2) Initialize dictionary $D=d_1;d_2 \ldots ;d_p$ with p basis or atoms; 3) Repeat J times; 4) Given a dictionary/basis p solve for coefficients $\alpha_i=\alpha_{i1}; \alpha_{i2}; \ldots \alpha_{ip}$ for all the patches using any compressive sensing algorithm (e.g., Orthogonal Matching Pursuit (OMP)), as shown in the equation below:

$$\alpha_i = \arg\min_{\alpha_i}(|\alpha_i|_1 + \lambda|p_i - D\alpha_i|_2^2) \quad (1)$$

5) Given the coefficients $\alpha_{i1}=\alpha_{i1}; '_{i2}; \ldots \alpha_{ip}$ use a series of KSVD operations to update both the coefficients and the dictionary atoms simultaneously; 6) Reconstruct the patch $p_i$ $$p_i = \sum_j \alpha_{ij} d_j \quad (2)$$

7) Overlay the patches, taking the average at the corresponding pixels to form the image. This method works very well for image de-noising and in-painting, since the learned dictionary constructed does not model noise. Hence, during reconstruction, by using the dictionary, noise is not represented. However, some of the high frequencies in the image may be lost by this representation.

Figure 8:
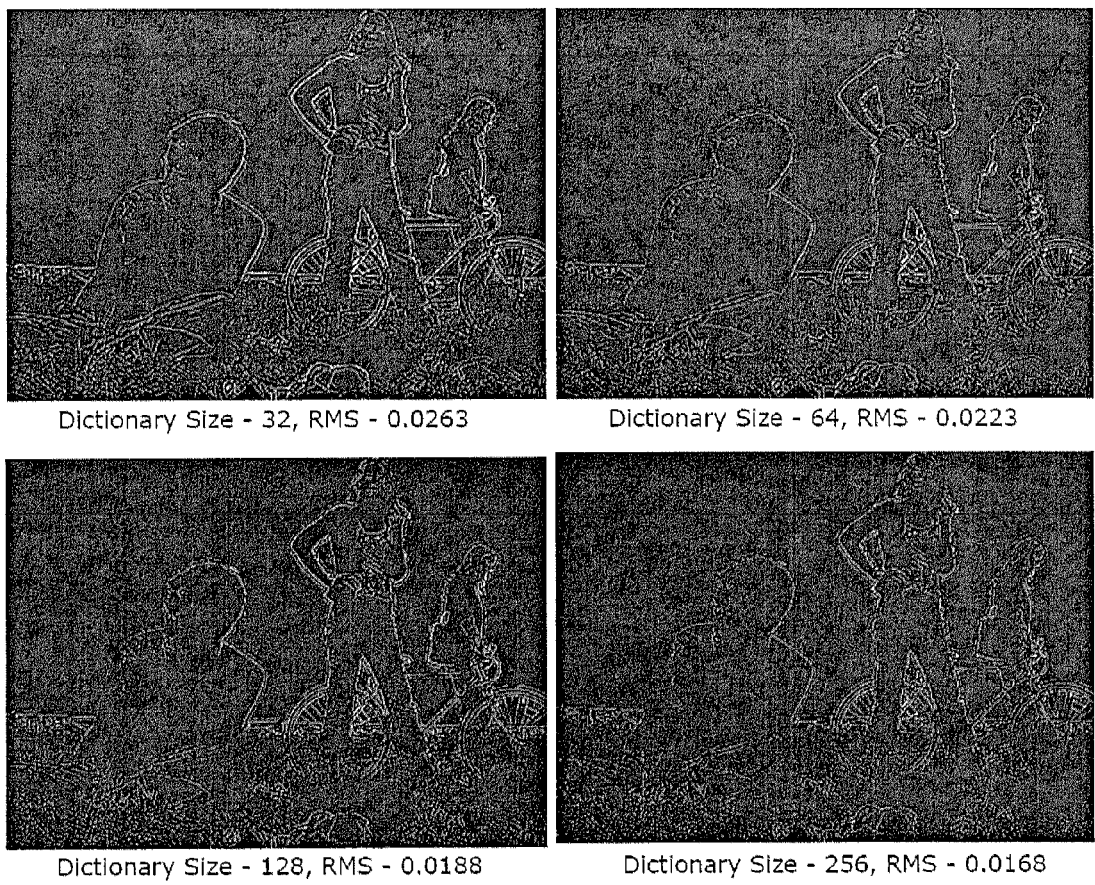
FIG. 8 is a schematic view of sparse representations of images with varying dictionary sizes.

The of number of atoms/basis p of the dictionary effects the quality of the images. FIG. 8 shows the reconstruction error with varying dictionary sizes. Image quality degrades slowly. It is likely that a better optimization function and error term will allow much fewer dictionary bases.

High frequencies may be introduced by optimizing gradients in a Sobolev space.

$$\alpha_i = \mathrm{argmin}(|\alpha_i|_1 + \lambda(|p_i - D\alpha_i|_2^2 + \mu|\nabla p_i - \nabla D\alpha_i|_2^2) \quad (3)$$
$$= \mathrm{argmin}(|\alpha_i|_1 + \lambda(|p_i - D\alpha_i|_2^2 + \mu|A[p_i - D\alpha_i]|_2^2)$$
$$= \mathrm{argmin}(|\alpha_i|_1 + \lambda(p_i - D\alpha_i)^T(I + \mu A^T A)(p_i - D\alpha_i))$$

Here A is the linear gradient operator (in matrix form) for the patch.

In some implementations, extending the framework to multi-scale has potential for improving the quality of image reconstruction. In some examples, LaPlacian pyramids are used to extend the framework. A separate dictionary may be learned for each level. In some examples, a method of reconstruction includes starting from a coarse level, reconstructing it, finding a residual/error, and adding the residual to a subsequent finer level of the pyramid before finding its representation. This prevents propagation of the error at each and every level.

As described with reference to FIGS. 1-3, stylization of an input image 102 includes two stages, the dictionary training stage 104 and the image sparse representation stage 106. The dictionary training stage 104 may be executed any time before the image sparse representation stage 106 and may use the algorithms described below.

Figure 9:
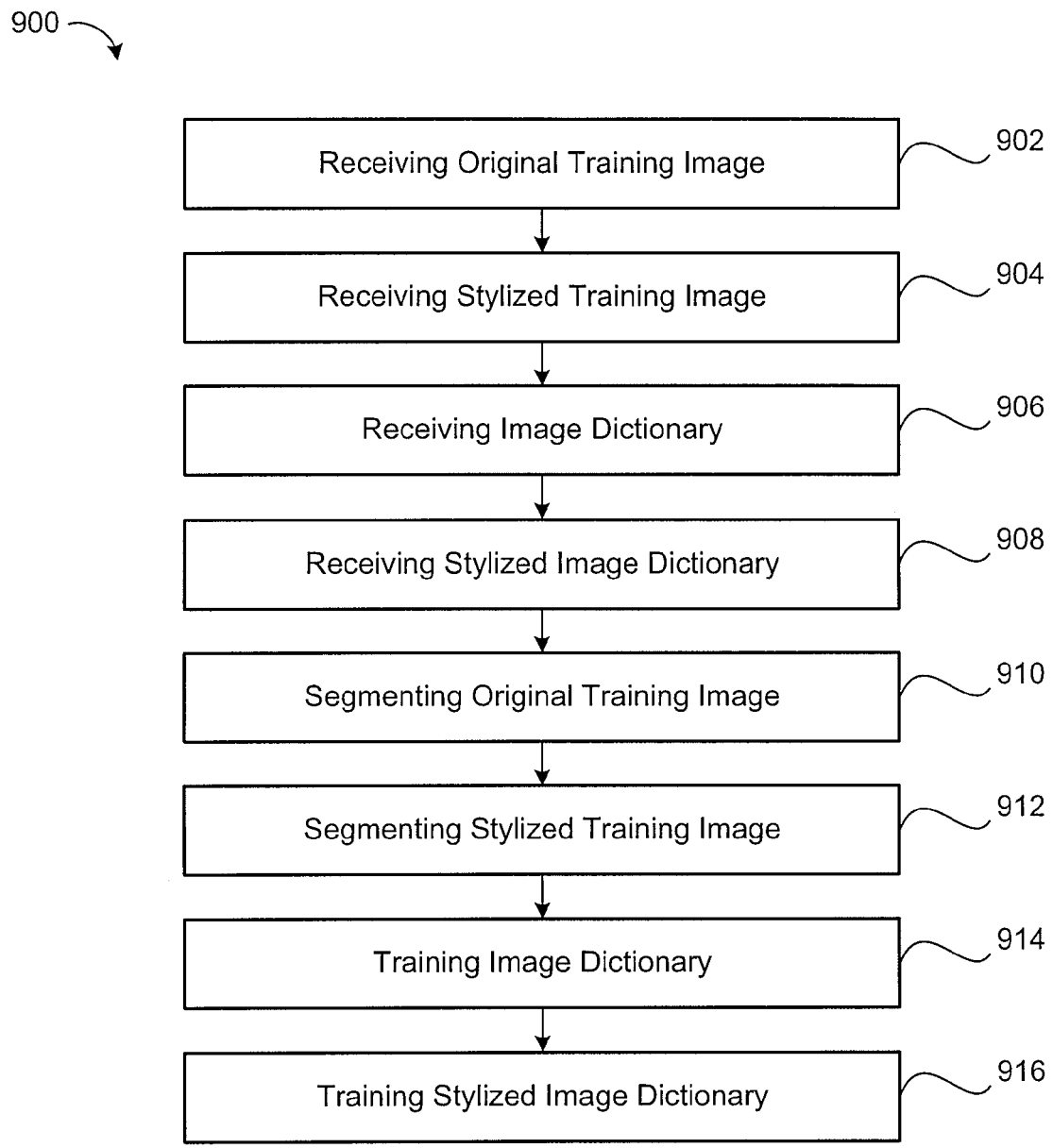
FIG. 9 is a flowchart that represents exemplary operations of a dictionary trainer.

Referring to FIG. 9, a flow chart 900 represents an arrangement of training operations of the dictionary trainer 200. Typically, the training operations are executed on a processor present in the computer 100, upon which the dictionary trainer 200 resides; however, the training operations may also be executed by multiple processors present in the computer 100. While typically executed by a single computer 100 (e.g., electronic device or computing device), in some arrangements, operation execution may be distributed among two or more computers 100.

Training operations include receiving 902 a training image and receiving 904 a stylized training image. Training operations also include receiving 906 an image dictionary and receiving 908 a stylized image dictionary. Training operations includes segmenting 910 the training image into training image patches and segmenting 912 the stylized training image into stylized training image patches. Each training image patch can be represented by a linear combination of dictionary image patches from the image dictionary, and each dictionary image patch has a sparse representation coefficient. Similarly, each stylized training image patch can be represented by a linear combination of stylized dictionary image patches from the stylized image dictionary, and each stylized dictionary image patch has a sparse representation coefficient. Training operations further include substantially simultaneously training 914 the image dictionary with the training image patches and training 916 the stylized image dictionary with the stylized training image patches, so that the sparse representation coefficient for each training image patch is substantially similar to the sparse representation coefficient for the corresponding stylized training image patch (e.g., to couple the image dictionary and the stylized image dictionary).

In some implementations, the dictionary trainer 200 executes a training algorithm for training an input image dictionary D and an input stylized image dictionary D'. The dictionary trainer 200 receives an input training image A and an input training stylized image A'. The input image dictionary D and the input stylized image dictionary D' are both initialized. The dictionary trainer 200 divides or segments the input training image A into input training image patches $p_i$, and also the input training stylized image A' into input training stylized image patches $p'_i$. The input training image patches $p_i$ and the input training stylized image patches $p'_i$ are used by the dictionary trainer 200 to train the dictionaries D, D' so that sparse representation coefficients $\alpha_i$ and $\alpha'_i$ are approximately the same. The trained dictionaries D, D' are used by the image stylizer 110 to produce a stylized version of an input image 102.

An exemplary dictionary training technique includes translating the dictionary D of a training image A to a dictionary D' of a stylized training image A'. The dictionaries D, D' should be such that for a patch $p_i$ in the training image A and corresponding patch p' i in the stylized training image A', $\alpha^*_i$ is the solution for both $$\mathrm{argmin}(|\alpha_i|_1 + \lambda|p_i - D\alpha_i|_2^2) \quad (4)$$
$$\mathrm{argmin}(|\alpha_i|_1 + \lambda|p'_i - D'\alpha_i|_2^2)$$

Given these two trained dictionaries D, D', the image stylizer 110 may execute a stylization technique using the dictionaries D, D' to produce a stylized version of an input image.

In some implementations, the dictionary training technique includes solving the image dictionary D and the stylized image dictionary D' simultaneously using the training image A and the stylized training image A' (e.g., stylized version of the training image A). Having constraints that the sparse representation coefficients $\alpha_i$ of the training image patch $p_i$ and the corresponding stylized training image patch $p'_i$ are approximately the same couples the dictionaries D, D' together for training. Two exemplary algorithms (referred to as a first and second algorithm) may be used to solve the above problem of simultaneously training the two dictionaries D and D'. In the first algorithm, dictionaries D, D' are used for the corresponding dictionaries for normal and stylized images A and A', and $\alpha_i$ and $\alpha'_i$ are the corresponding coefficients for patches $p_i$ and $p'_i$ respectively. For J iterations: 1) Solve for each patch $p_i$ $$\alpha_i^* = \underset{\alpha_i}{\operatorname{argmin}}(|\alpha_i|_1 + \lambda|p_i - D\alpha_i|_2^2 + \beta|\alpha_i - \alpha'_i|^2) \quad (5)$$

2) Solve the following optimization $$(\alpha_i^*, D*, D'^*) = \arg\min_{\alpha_i, D, D'} \lambda_1|p_i - D\alpha_i|_2^2 + \lambda_2|p'_i - D'\alpha'_i|_2^2 + \gamma|\alpha_i - \alpha'_i|^{2i} \quad (6)$$

3) Decrease the value of β and make it 0 in the last iteration. The first iteration involves only optimizing for αi, because during stylization the training image is provided and the first step is then to find the coefficients $\alpha_i$. The second optimization step finds the dictionaries D, D' and α$\alpha_i$. The last term in the equation puts a constraint that coefficients $\alpha_i$ and $\alpha'_i$ are very similar to each other because while stylization $\alpha_i$ is estimated and $\alpha_i$ for $\alpha'_i$ are substituted for stylizing with D'. In preferred examples, these two coefficients are close together. This constraint couples the two dictionary computations together, putting more constraints on the computation. The parameter β needs to go to 0 since only then the equation corresponds to sparse representation of the training image.

In the second algorithm, dictionaries D, D' are used for the corresponding dictionaries for normal and stylized images A and A', and $\alpha_i$ and $\alpha'_i$ are the corresponding coefficients for patches $p_i$ and $p'_i$ respectively. For J iterations: 1) Solve for each patch $p_i$ $$\alpha_i^* = \underset{\alpha_i}{\operatorname{argmin}}(|\alpha_i|_1 + \lambda|p_i - D\alpha_i|_2^2) \quad (7)$$

2) Solve the following optimization $$(\alpha_i^*, D*, D'^*) = \arg\min_{\alpha_i, D, D'} \lambda_1|p_i - D\alpha_i|_2^2 +$$
$$\lambda_2|p'_i - D'\alpha'_i|_2^2 + \lambda_3|p'_i - D'\alpha_i|_2^2 + \gamma|\alpha_i - \alpha'_i|^2 \quad (8)$$

The second algorithm is similar to the first algorithm, except the second algorithm includes an extra constraint in the second step of having $\alpha_i$ being a good approximation for representing patch $p'_i$ with dictionary D'. The constraint of β from the first equation is then removed.

Figure 10:
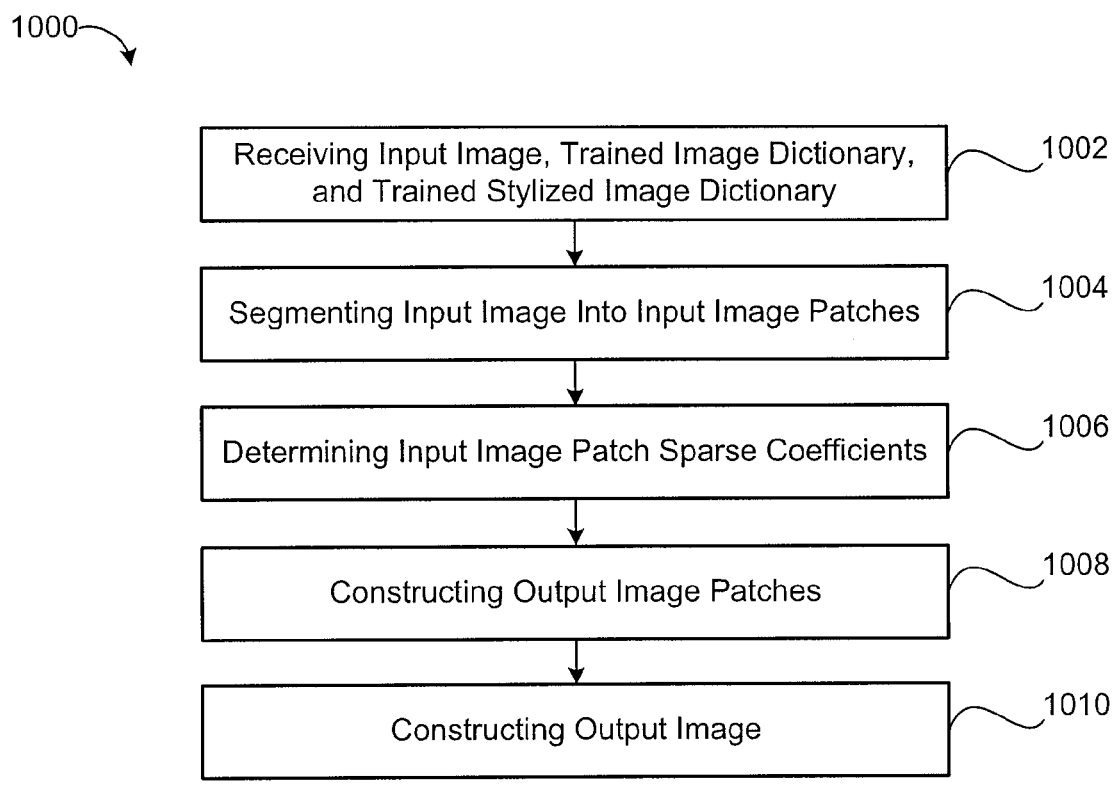
FIG. 10 is a flowchart that represents exemplary operations of an image stylizer.

Referring to FIG. 10, a flow chart 1000 represents an arrangement of styling operations of the image stylizer 10. Typically, the styling operations are executed on a processor present in the computer 100, upon which the image stylizer 110 resides; however, the styling operations may also be executed by multiple processors present in the computer 100. As mentioned earlier, while typically executed by a single computer 100 (e.g., electronic device or computing device), in some arrangements, operation execution may be distributed among two or more computers 100.

Styling operations includes receiving 1002 an input image, a trained image dictionary, and a trained stylized image dictionary. Styling operations also include segmenting 1004 the input image into input image patches and determining 1006 input image patch sparse coefficients using the trained image dictionary and the input image patches. Styling operations includes constructing 1008 output image patches using the trained stylized image dictionary and the input image patch sparse coefficients, and constructing 1010 an output image with the output image patches.

In some implementations, the image stylizer 110 executes a stylization algorithm for producing a stylized image B'. The image stylizer 110 receives an input image B, the trained input image dictionary D, and the trained stylized image dictionary D'. The image stylizer 110 divides or segments the input image B into input image patches $p_i$, and determines input image patch sparse coefficients $\alpha_i$ for image B, using the trained image dictionary D and the input image patches $p_i$. This allows alignment of the two dictionaries D, D' together so that the corresponding patches $p_i$, $p'_i$ use the same dictionary atom indexes from D and D' with same or similar coefficients. The image stylizer 110 constructs output image patches $p'_i$, using the trained stylized image dictionary D' and the input image patch sparse coefficients $\alpha_i$. The image stylizer 110 constructs the stylized image B' using the output image patches $p'_i$.

Given the trained image dictionary D and the trained stylized dictionary D', an exemplary stylization technique includes using image B as the only input, solving the problem:

$$\alpha_i^* = \underset{\alpha_i}{\operatorname{argmin}}(|\alpha_i|_1 + \lambda|p_i - D\alpha_i|_2^2) \quad (9)$$

for stylization, the stylized image patch $p'_i$ is constructed using:

$$p'_i = D'\alpha^*_i \quad (10)$$

Various implementations of the systems and techniques described here (e.g., the dictionary trainer 200 and the image stylizer 110) can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
executing instructions on a specific apparatus so that binary digital electronic signals representing a training image are segmented into binary digital electronic signals representing a plurality of training image patches, each training image patch being represented by a linear combination of dictionary image patches from an image dictionary, each dictionary image patch having a sparse representation coefficient;
executing instructions on the specific apparatus so that binary digital electronic signals representing a stylized training image are segmented into binary digital electronic signals representing a plurality of training image patches, each stylized training image patch being represented by a linear combination of stylized dictionary image patches from a stylized image dictionary, each stylized dictionary image patch having a sparse representation coefficient; and
executing instructions on the specific apparatus so that the image dictionary is trained substantially simultaneously with the training image patches and the stylized image dictionary with the stylized training image patches, wherein the sparse representation coefficient for each training image patch is substantially similar to the sparse representation coefficient for the corresponding stylized training image patch; and
storing the resulting binary digital electronic signals representing the corresponding image dictionary and the stylized image dictionary in a location in memory of the specific apparatus for later use.

2. A computer-implemented method comprising:
segmenting a training image into training image patches, each training image patch being represented by a linear combination of dictionary image patches from an image dictionary, each dictionary image patch having a sparse representation coefficient;
segmenting a stylized training image into stylized training image patches, each stylized training image patch being represented by a linear combination of stylized dictionary image patches from a stylized image dictionary, each stylized dictionary image patch having a sparse representation coefficient; and
substantially simultaneously training the image dictionary with the training image patches and the stylized image dictionary with the stylized training image patches, wherein the sparse representation coefficient for each training image patch is substantially similar to the sparse representation coefficient for the corresponding stylized training image patch.

3. The computer-implemented method of claim 2, further comprising:
segmenting an input image into input image patches;
for each input image patch, determining sparse representation coefficients for a linear combination of trained image patches of the trained image dictionary;
for each input image patch, producing a corresponding output stylized image patch as a linear combination of trained stylized image patches of the trained stylized image dictionary using the input image patch sparse representation coefficients; and
producing an output stylized image using the output stylized image patches.

4. The computer-implemented method of claim 2, wherein the sparse coefficients for each input image patch approximately represent an output stylized image patch of the output stylized image with the stylized image dictionary.

5. The computer-implemented method of claim 2, wherein an atom index included in the image dictionary is substantially equivalent to an atom index included in the stylized image dictionary.

6. The computer-implemented method of claim 2, wherein each dictionary comprises an over-complete basis.

7. The computer-implemented method of claim 2, further comprising iteratively training the image dictionary and the stylized image dictionary.

8. The computer-implemented method of claim 2, wherein the image dictionary and the stylized image dictionary are substantially aligned so that the corresponding image patches use the same dictionary atom indexes from the respective dictionaries with substantially similar sparse representation coefficients.

9. A system comprising a computing device comprising:
a dictionary trainer for segmenting a training image into training image patches, each training image patch being represented by a linear combination of dictionary image patches from an image dictionary, each dictionary image patch having a sparse representation coefficient, the dictionary trainer also configured for segmenting a stylized training image into stylized training image patches, each stylized training image patch being represented by a linear combination of stylized dictionary image patches from a stylized image dictionary, each stylized dictionary image patch having a sparse representation coefficient, the dictionary trainer further configured for substantially simultaneously training the image dictionary with the training image patches and the stylized image dictionary with the stylized training image patches, wherein the sparse representation coefficient for each training image patch is substantially similar to the sparse representation coefficient for the corresponding stylized training image patch.

10. The system of claim 9, wherein the computing device further comprises an image stylizer for segmenting an input image into input image patches, the image stylizer being configured to determine sparse representation coefficients for a linear combination of trained image patches of the trained image dictionary for each input image patch, the image stylizer also configured to produce a corresponding output stylized image patch for each input image patch from a linear combination of trained stylized image patches of the trained stylized image dictionary using the input image patch sparse representation coefficients, the image stylizer further configured to produce an output stylized image using the output stylized image patches.

11. The system of claim 9, wherein the sparse coefficients for each input image patch approximately represent an output stylized image patch of the output stylized image with the stylized image dictionary.

12. The system of claim 9, wherein an atom index included in the image dictionary is substantially equivalent to an atom index included in the stylized image dictionary.

13. The system of claim 9, wherein each dictionary comprises an over-complete basis.

14. The system of claim 9, wherein the dictionary trainer is configured to iteratively train the image dictionary and the stylized image dictionary.

15. The system of claim 9, wherein the dictionary trainer is configured to substantially align the image dictionary and the stylized image dictionary so that the corresponding image patches use the same dictionary atom indexes from the respective dictionaries with substantially similar sparse representation coefficients.

16. A computer program product, encoded on a non-transitory computer-readable medium, operable to cause data processing apparatus to perform operations comprising:

segmenting a training image into training image patches, each training image patch being represented by a linear combination of dictionary image patches from an image dictionary, each dictionary image patch having a sparse representation coefficient;

segmenting a stylized training image into stylized training image patches, each stylized training image patch being represented by a linear combination of stylized dictionary image patches from a stylized image dictionary, each stylized dictionary image patch having a sparse representation coefficient; and substantially simultaneously training the image dictionary with the training image patches and the stylized image dictionary with the stylized training image patches, wherein the sparse representation coefficient for each training image patch is substantially similar to the sparse representation coefficient for the corresponding stylized training image patch.

17. The computer program product of claim 16, wherein the operations performed by the data processing apparatus further comprises:

segmenting an input image into input image patches;

for each input image patch, determining sparse representation coefficients for a linear combination of trained image patches of the trained image dictionary;

for each input image patch, producing a corresponding output stylized image patch as a linear combination of trained stylized image patches of the trained stylized image dictionary using the input image patch sparse representation coefficients; and producing an output stylized image using the output stylized image patches.

18. The computer program product of claim 16, wherein the sparse coefficients for each input image patch approximately represent an output stylized image patch of the output stylized image with the stylized image dictionary.

19. The computer program product of claim 16, wherein an atom index included in the image dictionary is substantially equivalent to an atom index included in the stylized image dictionary.

20. The computer program product of claim 16, wherein each dictionary comprises an over-complete basis.

21. The computer program product of claim 16, wherein the operations performed by the data processing apparatus further comprises iteratively training the image dictionary and the stylized image dictionary.

22. The computer program product of claim 16, wherein the operations performed by the data processing apparatus further comprises substantially aligning the image dictionary and the stylized image dictionary so that the corresponding image patches use the same dictionary atom indexes from the respective dictionaries with substantially similar sparse representation coefficients.

* * * * *